(12) United States Patent
Dietsch et al.

(10) Patent No.: US 11,691,507 B2
(45) Date of Patent: Jul. 4, 2023

(54) MOTOR VEHICLE

(71) Applicant: Saeta GmbH & Co. KG, Wedel (DE)

(72) Inventors: Christian Dietsch, Lorsch (DE); Matthias Tamm, Itzehoe (DE)

(73) Assignee: Saeta GmbH & Co. KG, Wedel (DE)

( * ) Notice: Subject to any disclaimer, the term of this patent is extended or adjusted under 35 U.S.C. 154(b) by 583 days.

(21) Appl. No.: 16/545,719

(22) Filed: Aug. 20, 2019

(65) Prior Publication Data

US 2020/0062115 A1 Feb. 27, 2020

(30) Foreign Application Priority Data

Aug. 21, 2018 (DE) .................... 20 2018 104 795.7

(51) Int. Cl.
| | |
|---|---|
| *B60K 25/06* | (2006.01) |
| *B60L 1/00* | (2006.01) |
| *B66D 1/12* | (2006.01) |
| *B66D 1/22* | (2006.01) |
| *B60K 17/28* | (2006.01) |

(52) U.S. Cl.
CPC ............ *B60K 25/06* (2013.01); *B60K 17/28* (2013.01); *B60L 1/003* (2013.01); *B66D 1/12* (2013.01); *B66D 1/22* (2013.01)

(58) Field of Classification Search
CPC ........ B60K 25/06; B60K 25/00; B60K 17/28; B60L 1/003; B66D 1/12; B66D 1/22; B60Y 2200/14
See application file for complete search history.

(56) References Cited

U.S. PATENT DOCUMENTS

| | | | | |
|---|---|---|---|---|
| 2,059,950 | A * | 11/1936 | Johnson | E01C 19/205 291/32 |
| 9,835,072 | B2 * | 12/2017 | Seo | F02B 67/10 |
| 10,549,634 | B1 * | 2/2020 | Vittatoe | F04C 29/04 |
| 2008/0173113 | A1 * | 7/2008 | Van Schothorst | B60K 17/10 74/11 |
| 2010/0078234 | A1 | 4/2010 | Bissontz | |
| 2010/0154572 | A1 * | 6/2010 | Prampolini | B60K 17/28 74/15.66 |
| 2011/0011073 | A1 * | 1/2011 | Bradley | F16D 35/005 60/329 |
| 2011/0135510 | A1 * | 6/2011 | Mellar | F04B 17/05 417/319 |

(Continued)

FOREIGN PATENT DOCUMENTS

| | | |
|---|---|---|
| DE | 9212000 U1 | 1/1994 |
| DE | 10201365 A1 | 7/2003 |
| DE | 202004000312 U1 | 5/2005 |

(Continued)

OTHER PUBLICATIONS

EP 19191412; Filed Aug. 13, 2019; European Search Report dated Apr. 2, 2020 (8 pages).

*Primary Examiner* — James A English
*Assistant Examiner* — Scott F. Underwood
(74) *Attorney, Agent, or Firm* — Barclay Damon LLP

(57) ABSTRACT

A motor vehicle including a drive gearbox connected to a drive motor of the motor vehicle, a power take-off connected to an auxiliary output of the drive gearbox, and an auxiliary unit connected to the power take-off. The auxiliary unit is coupled with the power take-off such that the auxiliary unit is disposed below the drive gearbox.

8 Claims, 2 Drawing Sheets

(56) References Cited

U.S. PATENT DOCUMENTS

2011/0293444 A1* 12/2011 Bariau ................ F04C 15/0061
  417/319
2017/0274766 A1* 9/2017 Raab ...................... B60K 25/00

FOREIGN PATENT DOCUMENTS

EP       1928684 B1    12/2010
WO    2009/146908 A1  12/2009

* cited by examiner

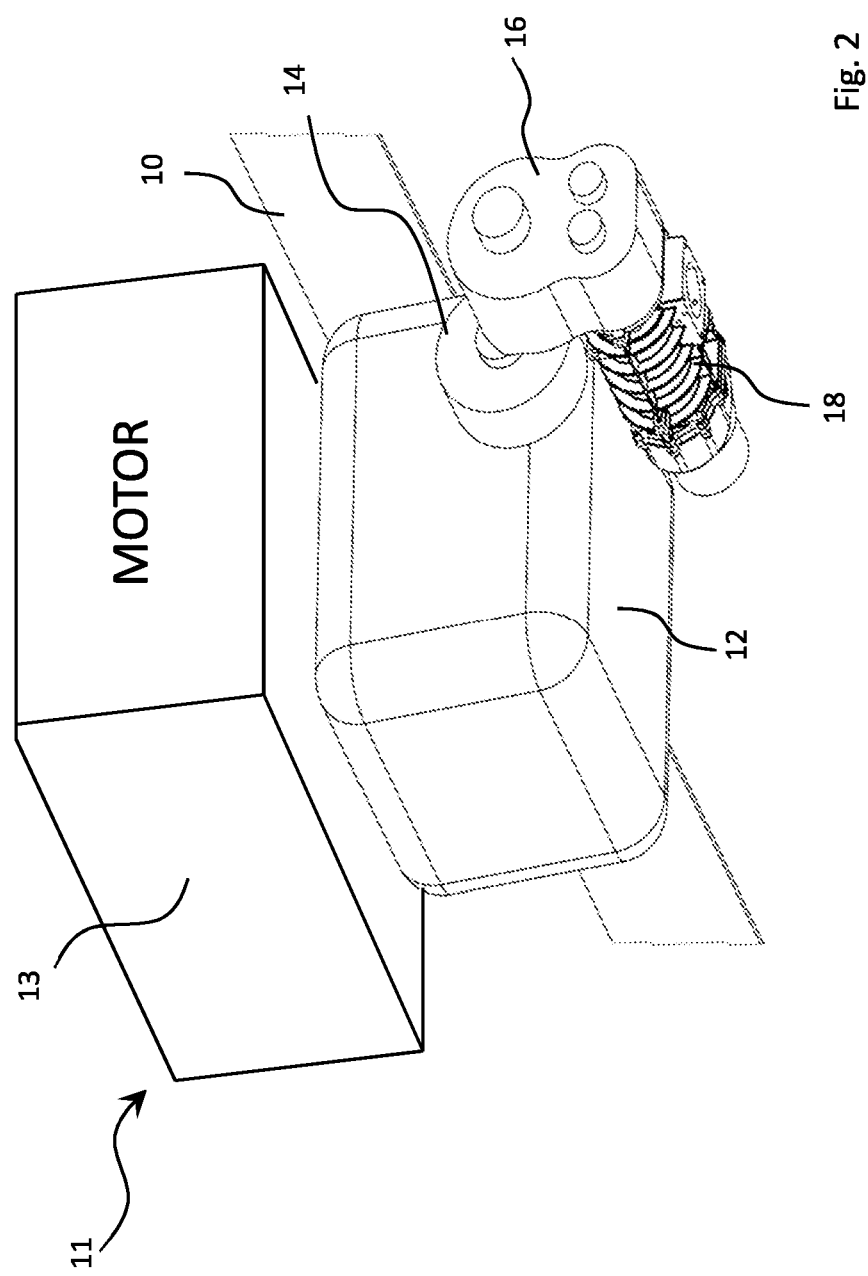

MOTOR VEHICLE

CROSS REFERENCE TO RELATED DISCLOSURE

This application is based upon and claims priority to, under relevant sections of 35 U.S.C. § 119, German Utility Model Patent Application No. 20 2018 104 795.7, filed Aug. 21, 2018, the entire contents of which are hereby incorporated by reference.

TECHNICAL FIELD

This disclosure relates to a motor vehicle, and, more particularly to an motor vehicle/industrial truck comprising a gearbox connected to a motor for driving the motor vehicle/industrial truck, a power take-off connected to the gearbox and an auxiliary unit connected to the power take-off.

BACKGROUND

The gearbox of motor vehicles, such as industrial trucks, often have a power take-off (PTO) connected to an output of the gearbox. Auxiliary units, can then be driven via the drive motor via the power take-off.

It is well-known to connect auxiliary units to a power take-off via one or more drive shafts. One disadvantage, however, relates to the limited axle and angle offsets which are possible with such prior art power take-offs. Moreover, a drive shaft associated with a construction-related minimum length causes the overall size of the industrial truck to grow to undesirably large dimensions. Moreover, there is very little installation space available, in particular, in the area behind, or aft of, the drive gearbox, due to additional components, for example, an exhaust after-treatment system. Furthermore, high temperatures, which can develop in this area, can stress the auxiliary unit.

Drive shafts also require considerable maintenance, which can damage the auxiliary unit, if neglected. Additionally, an openly-rotating drive shaft can be a potential source of danger. One potential solution has been to flange-mount auxiliary units directly to the power take-off. In this design, the auxiliary unit connects directly to the drive gearbox, when viewed in a direction opposite to the forward direction of the industrial vehicle. By omitting the drive shaft, the associated disadvantages can be avoided, however, this does not solve the problems associated with the (i) high temperatures, (ii) high stresses and (iii) decreased space available for installation of an auxiliary unit.

The foregoing background describes some, but not necessarily all, of the problems, disadvantages and shortcomings related to high aspect ratio telecommunications antennas.

BRIEF SUMMARY OF THE DISCLOSURE

The object of the disclosure is to provide a motor vehicle wherein an auxiliary unit can be powered by the motor vehicle gearbox taking into consideration the limited installation space, high temperatures, high stresses and high operating loads acting on the gearbox.

It is, therefore, an object of the present disclosure to provide an industrial truck having a drive gearbox with a power take-off disposed below the gearbox to obviate the difficulties associated with heat, stress and limited space available for an auxiliary unit.

The motor vehicle can be a truck having an exhaust after-treatment which meets European emission standard Euro 6. The drive gearbox of the motor vehicle connects the drive motor to the drive axle of the motor vehicle. The drive motor can be the main drive motor of the motor vehicle, or alternatively, a secondary motor. The drive gearbox can form a drive block together with the drive motor and can be spring-mounted on a support frame of the motor vehicle, for example, with a corresponding freedom of movement.

According to the disclosure, the auxiliary unit is coupled with the power take-off such that the auxiliary unit is arranged below the drive gearbox. In the context used herein, positional or directional information such as "top", "bottom" or the like is used, and refers to the operating position of the motor vehicle. A downward direction corresponds to the direction of gravity. In the case of the present disclosure, the auxiliary unit is thus located in an area vertically below the drive gearbox of the motor vehicle. This arrangement is enabled through the coupling of the power take-off with the auxiliary unit. The coupling can be realized in a particularly practical manner through an auxiliary gearbox. This auxiliary gearbox can be part of the auxiliary unit. The power take-off can comprise a power take-off shaft with which the auxiliary gearbox is connected.

In the described embodiment, the auxiliary unit is arranged in an area, which is not occupied by other components of the motor vehicle. The installation space problems, explained in the background section of the disclosure, are thus avoided. In particular, the auxiliary unit is not located in an area in which other components, such as components of an exhaust after-treatment, are arranged. It will, therefore, be appreciated that the temperature load is considerably lower than that produced by an exhaust after-treatment system. This results in a lower temperature load and more robust arrangement of the auxiliary unit. Moreover, the lever load of the power take-off, is reduced considerably.

According to one embodiment, the motor vehicle can be a truck with a loading container, for example, a silo vehicle. Accordingly, the auxiliary unit can be an unloading unit for unloading a payload from the loading container of the truck. The unloading unit can, for example, be a pump unit. The payload to be unloaded can, for example, be a bulk material such as a powdered silo bulk material. However, it can also be a liquid or a gas. The liquid can be a liquid from the food industry, such as a cooking oil. Alternatively, the liquid may be a fuel for gas/diesel burning vehicles.

According to another embodiment, the auxiliary unit can be a compressor such as a screw compressor. However, it may also be a vane compressor such as those particularly well-suited for unloading bulk material, or a fluid from a loading container of a truck.

According to yet another embodiment, the auxiliary unit can extend from the coupling with the power take-off, from the auxiliary gearbox substantially in the forward driving direction of the motor vehicle. The auxiliary unit can thus extend in the motor vehicle toward the front of the vehicle. The power take-off usually extends from the drive gearbox in the opposite direction to the forward driving direction of the motor vehicle. The arrangement of the auxiliary unit below the drive gearbox is enabled by the present disclosure. A power take-off shaft, and an aggregate shaft of the auxiliary unit, can run parallel, wherein the flow of power between these shafts can be reversed by approximately 180° through the coupling, and in particular, by the auxiliary gearbox.

According to yet another embodiment, the auxiliary unit can be coupled with the power take-off without the requirement for a drive shaft. Through the direct coupling of the auxiliary unit with the power take-off, a greater axle and angle offset is provided. Furthermore, the direct coupling of the auxiliary unit reduces the installation space which must be available for assembly of the power take-off and the auxiliary unit.

Additional features and advantages of the present disclosure are described in, and will be apparent from, the following Brief Description of the Drawings and Detailed Description.

BRIEF DESCRIPTION OF THE DRAWINGS

An exemplary embodiment of the disclosure is explained below in greater detail with reference to figures. Schematically:

FIG. 2 depicts shows a perspective view of the motor, gearbox and auxiliary unit shown in FIG. 1.

The same reference numerals refer to the same objects in the figures unless indicated otherwise.

DETAILED DESCRIPTION OF THE DISCLOSURE

Figure 1:
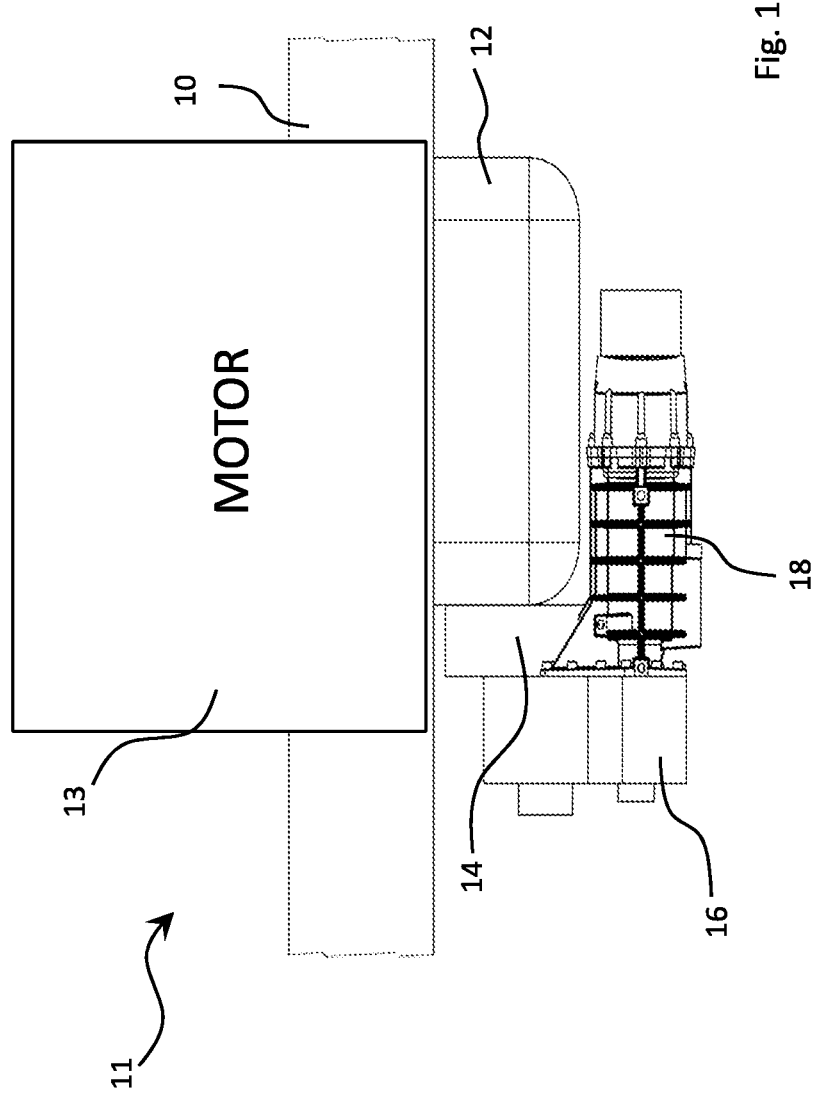
FIG. 1 depicts a broken-away side view of a motor vehicle according to the present disclosure including a gearbox, an auxiliary drive, and a take-off unit which is disposed vertically below the gearbox.

In FIG. 1, a support frame 10 is provided for a motor vehicle/industrial truck 11 wherein the motor vehicle/industrial truck 11, can, for example, be a silo truck. A drive gearbox of the motor vehicle/industrial truck 11 is integrated into a drive block 12 which is suspended from, and mounted below, the support frame 10. The drive block/gearbox 12 receives power from a drive motor 13 of the motor vehicle/industrial truck 11, which may be the main drive motor of the motor vehicle. A power take-off 14 is coupled to the drive gearbox 12 for the purpose of providing power to a secondary system such as for a compressor, hydraulic lift, and/or a winch unit 18, for example. In the described embodiment, an auxiliary gearbox 16 is coupled to one side of the primary drive gearbox 12. The compressor, hydraulic lift, or a winch unit 18 is connected to the other side of the with an auxiliary gearbox 16. The auxiliary gearbox 16 can be part of the auxiliary unit 18 or may be a removable/detachable unit. A compressor 18 can be provided, for example, to power a pneumatic source for unloading a bulk material from a container of a silo vehicle. Other applications are of course also possible.

FIG. 1 shows the drive gearbox 12 disposed below the motor 13 while the auxiliary unit 18 is disposed below the gearbox 12. The power take-off 14 receives power from an aft end of the gearbox 12 and the auxiliary power unit 16 receives power from the aft end of the power take-off 14. Accordingly, the auxiliary unit 18 is vertically below auxiliary power unit 16, which is vertically below the power take-off 14, which is vertically below the drive gearbox 12, which is, in turn, vertically below the motor 13. Furthermore, it will be appreciated that the auxiliary unit 18 projects forwardly, i.e., in the direction of forward travel, of the auxiliary power unit 16.

In the described embodiment, the auxiliary gearbox 16 forms an angle gear with a change in direction of one-hundred and eighty degrees (180°). Furthermore, the auxiliary unit 18 is coupled to the power take-off 14 without the need for an extending drive shaft. In particular, in the example shown, the auxiliary gearbox 16 represents a single connection, i.e., a flanged connection, between the power take-off 14 and the auxiliary unit 18.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

LIST OF REFERENCE NUMBERS

10 Support frame
11 Motor Vehicle
12 Drive gearbox
13 Motor
14 Power take-off
16 Auxiliary gearbox
18 Auxiliary unit

The invention claimed is:

1. A motor vehicle comprising:
   a drive motor;
   a drive gearbox connected to and receiving power from the drive motor;
   a power take-off connected to the drive gearbox and comprising a power take-off shaft; and
   an auxiliary unit connected to the power take-off,
   wherein the auxiliary unit is coupled to the power take-off shaft by an auxiliary gearbox such that the auxiliary unit is disposed directly under the drive gearbox.

2. The motor vehicle according to claim 1, wherein the auxiliary unit is an unloading unit for unloading a payload from the motor vehicle.

3. The motor vehicle according to claim 1, wherein the auxiliary unit is a compressor.

4. The motor vehicle according to claim 1, wherein the auxiliary unit extends from the power take-off in a direction corresponding to a forward direction of travel of the motor vehicle.

5. The motor vehicle according to claim 1, wherein the auxiliary unit is configured to be flange-connected to the power take-off without an intervening drive shaft.

6. The motor vehicle according to claim 1, wherein the power take-off connects to an auxiliary output of the drive gearbox.

7. The motor vehicle according to claim 1, wherein the motor vehicle includes a loading container and wherein the auxiliary unit is an unloading unit for removing a payload from the loading container of the motor vehicle.

8. A motor vehicle comprising a drive motor, a drive gearbox connected to and receiving power from the drive motor, a power take-off connected to the drive gearbox, and an auxiliary unit connected to the power take-off, the drive gearbox being mounted directly under the drive motor, the auxiliary unit being mounted below the drive gearbox, and the power take-off being mounted to the drive gearbox at an end of the drive gearbox positioned in an opposite direction to a forward driving direction of the motor vehicle,
   wherein the power take-off is flange mounted to the drive gearbox to eliminate a requirement for an intervening drive shaft between the power take-off and the auxiliary unit, and
   wherein the auxiliary unit projects forwardly of the power take-off in a direction corresponding to a forward motion of motor vehicle travel.

\* \* \* \* \*